Dec. 23, 1969  H. R. ANDERSON ET AL  3,485,442
GAS TURBINE ENGINES
Original Filed Sept. 13, 1965   8 Sheets-Sheet 1
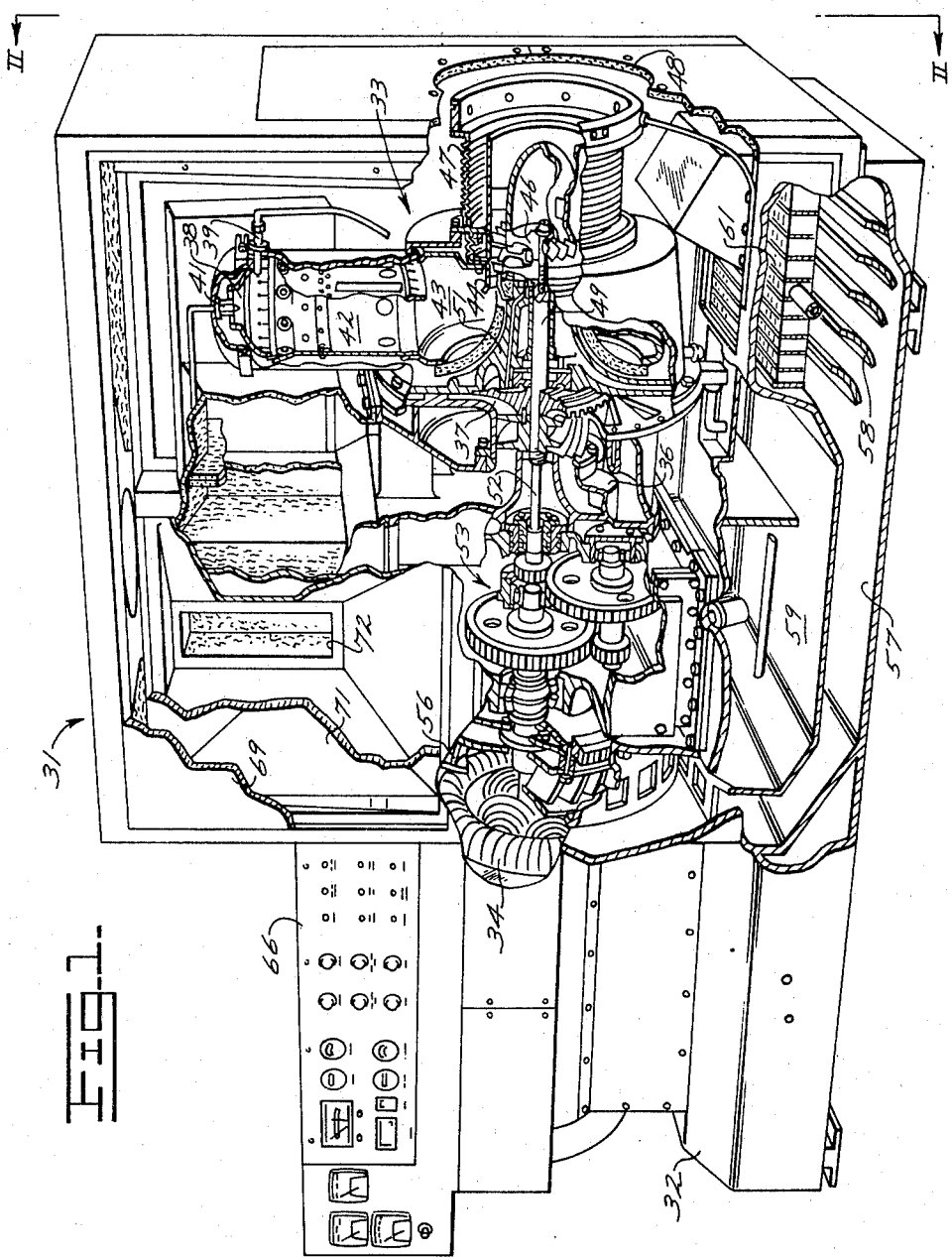
INVENTORS
HOWARD R. ANDERSON
PHILIP E. LAMBDIN
WILLIAM A. MITCHENER

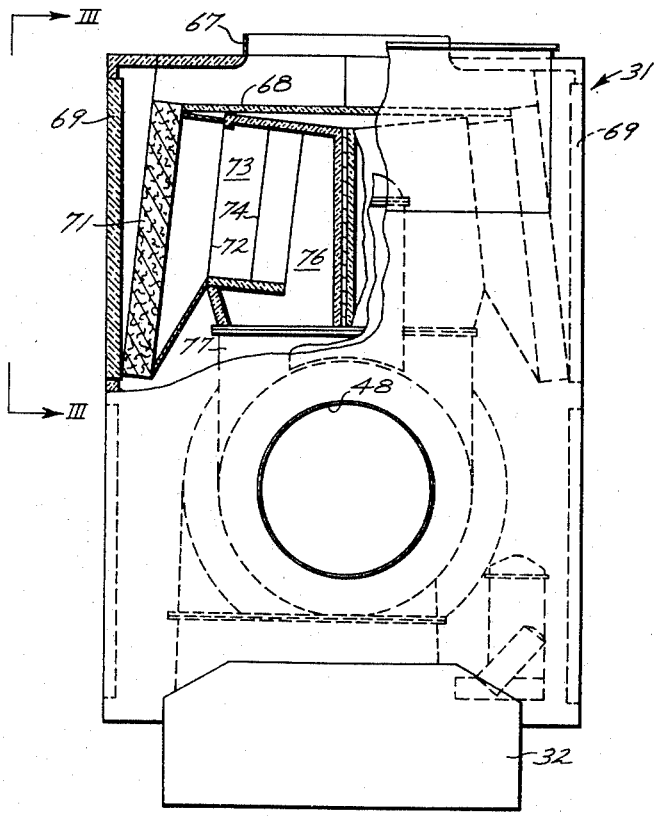
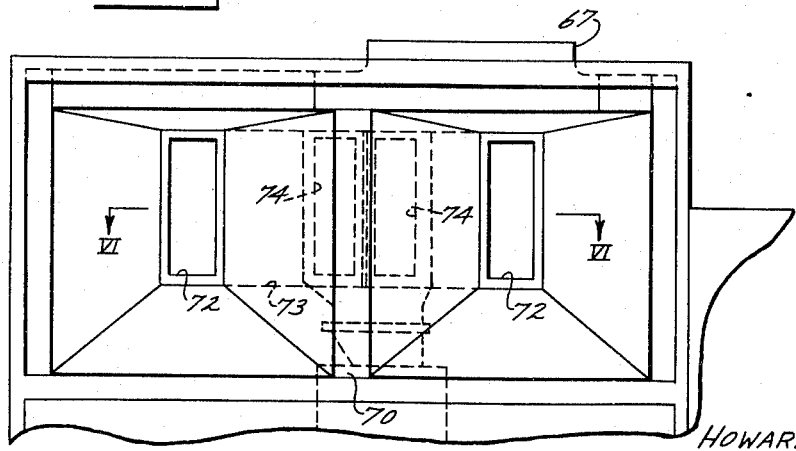

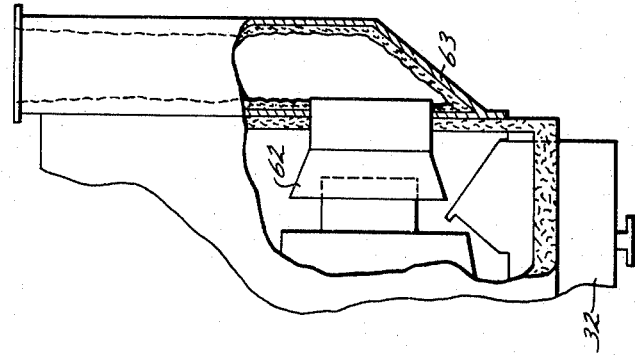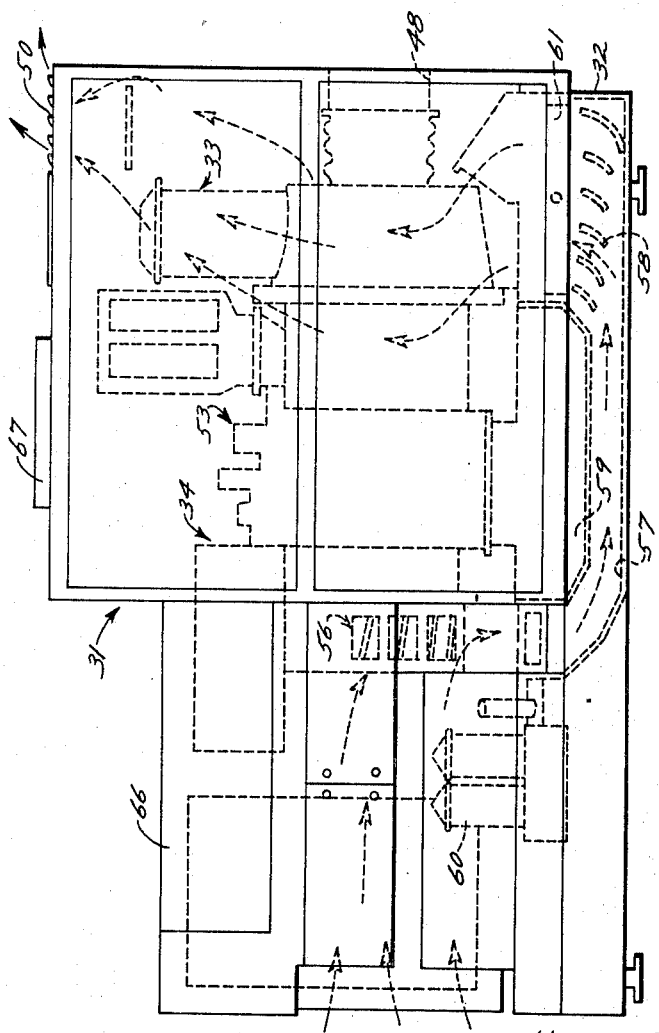

Dec. 23, 1969  H. R. ANDERSON ET AL  3,485,442
GAS TURBINE ENGINES
Original Filed Sept. 13, 1965  8 Sheets-Sheet 4
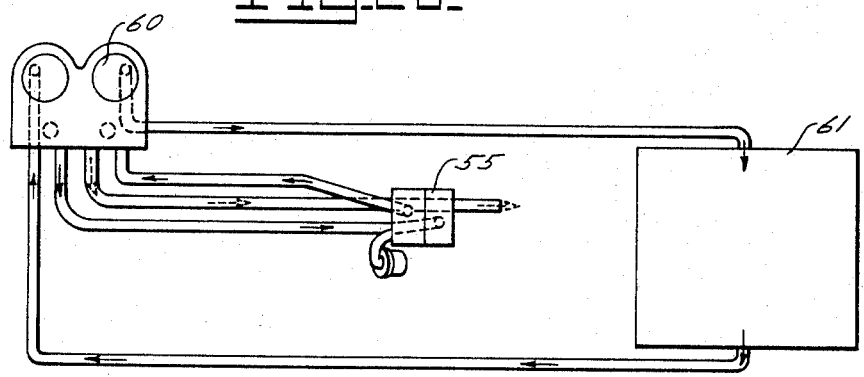
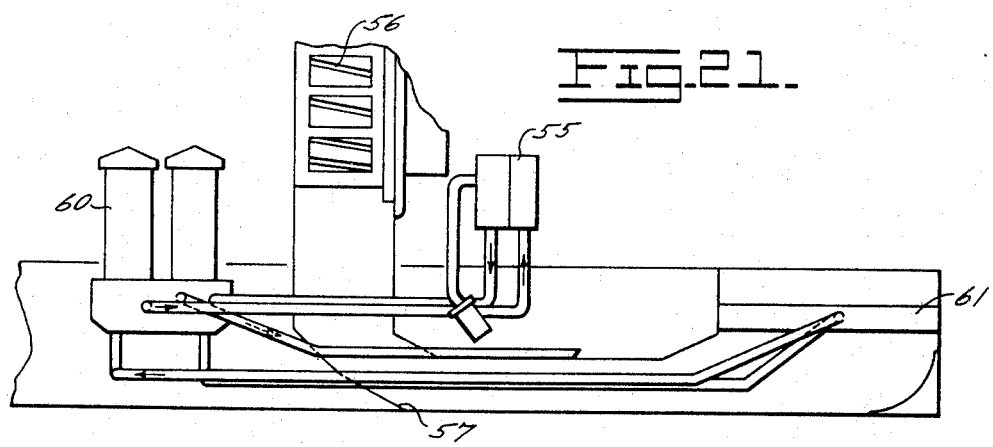
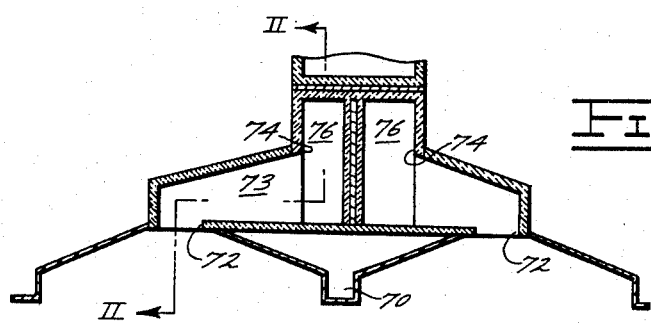
INVENTORS
HOWARD R. ANDERSON
PHILIP E. LAMBDIN
WILLIAM A. MITCHENER

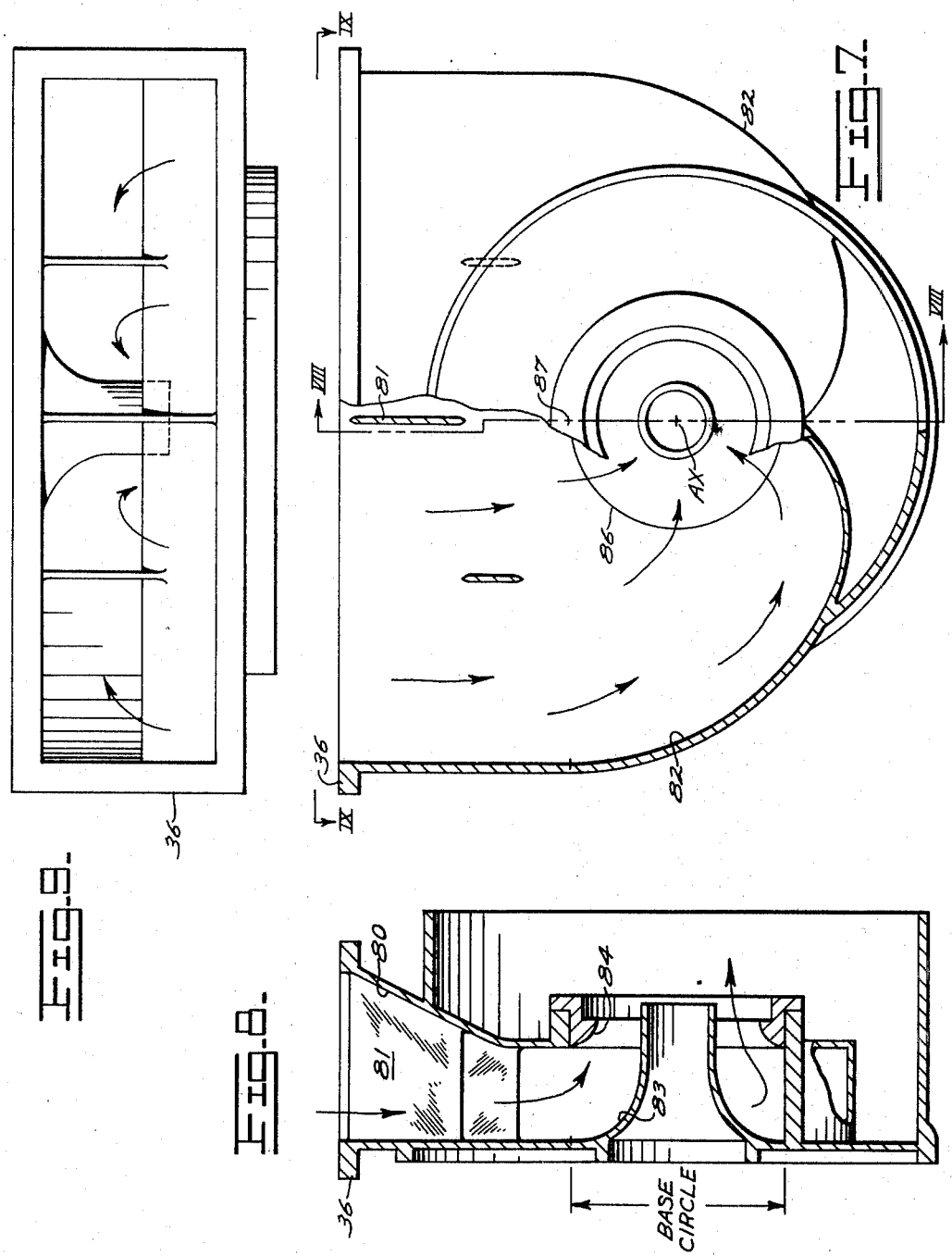

Dec. 23, 1969 H. R. ANDERSON ET AL 3,485,442
GAS TURBINE ENGINES
Original Filed Sept. 13, 1965 8 Sheets-Sheet 6
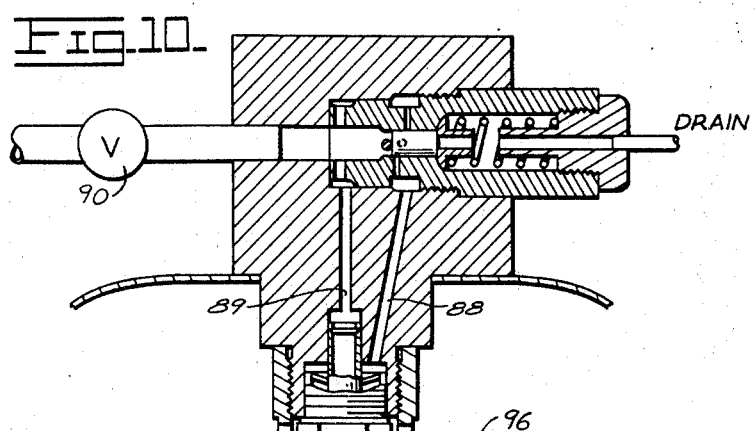
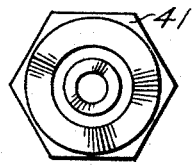
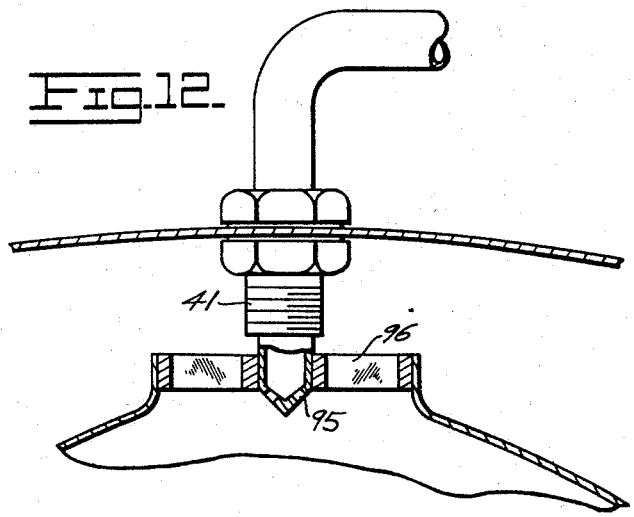
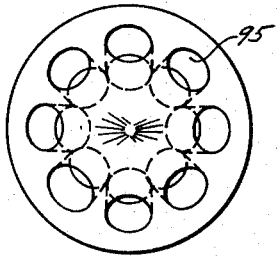
INVENTORS
HOWARD R. ANDERSON
PHILIP E. LAMBDIN
WILLIAM A. MITCHENER Dec. 23, 1969  H. R. ANDERSON ET AL  3,485,442
GAS TURBINE ENGINES
Original Filed Sept. 13, 1965  8 Sheets-Sheet 7

INVENTORS
HOWARD R. ANDERSON
PHILIP E. LAMBDIN
WILLIAM A. MITCHENER

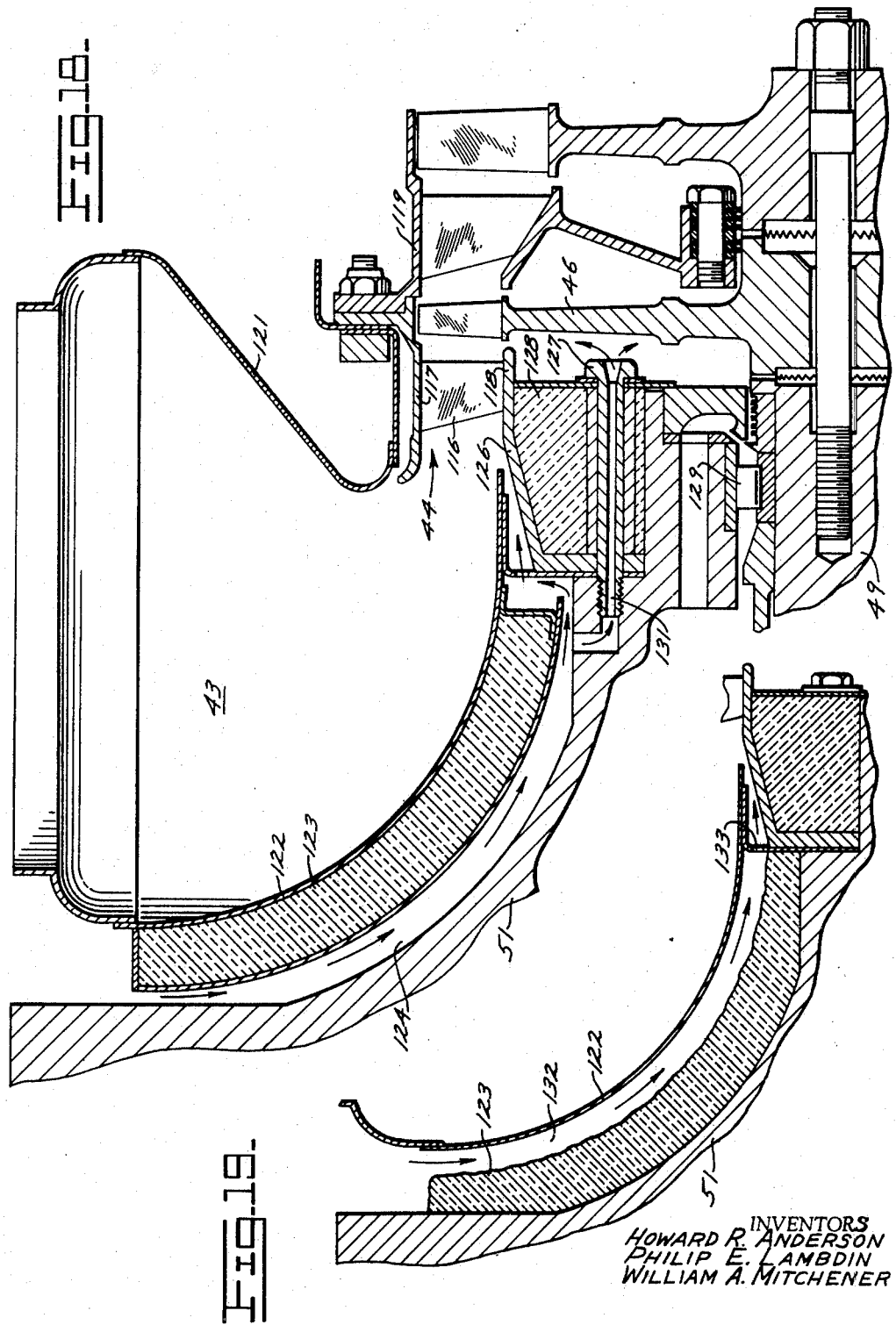

United States Patent Office 3,485,442
Patented Dec. 23, 1969

3,485,442
GAS TURBINE ENGINES
Howard R. Anderson, Marquette Heights, and Philip E. Lambdin and William A. Mitchener, Peoria, Ill., assignors to Caterpillar Tractor Co., Peoria, Ill., a corporation of California
Original application Sept. 13, 1965, Ser. No. 486,818, now Patent No. 3,418,485, dated Dec. 24, 1968. Divided and this application July 22, 1968, Ser. No. 763,451
Int. Cl. F04b 39/06, 29/32, 29/66
U.S. Cl. 230—232          4 Claims

ABSTRACT OF THE DISCLOSURE

A compressor air inlet housing having two distinct regions for handling incoming air flow. The first region turns the incoming air through a variety of angles, up to a maximum angle of 180 degrees, from a vertical direction to a radial direction with respect to the axis of compressor rotation. The second region turns the air from the radial direction through 90 degrees to an axial direction, while accelerating the flow.

---

This is a division of application Ser. No. 486,818, filed Sept. 13, 1965, and now U.S. Patent No. 3,418,485.

This invention relates to gas turbine engines and particularly to an integrated enclosure and mounting arrangement for a gas turbine engine and electric generator set.

The industrial gas turbine engine of the present invention is a self-contained engine package which incorporates a rigid base, all necessary ducting for silencing and filtering the engine air, and all the ducting required for cooling and ventilating as an integral part of the package. The exhaust gas ducting and all the operating controls for the engine and the generator are also included as a part of the package.

The rigid and integrally formed base facilitates transport of the engine package and eliminates the need for attachment of the engine and generator to an auxiliary mounting base when the engine is installed.

In many installations, such as roof-top installations, where heat recovery from the exhaust gases is not desired and the exhaust gases can be ventilated directly to atmosphere, the self-contained enclosure of the present invention eliminates practically all installation procedures except for attachment of fuel lines and power lines for the generator. Such highly simplified and minimum installation requirements are a primary object of the present invention.

It is an important object of the present invention to so construct the enclosure as to maintain design control of the intake air and filtering system and also the oil cooling and filtering system, rather than leaving such design in the hands of the person or persons installing the engine.

It is another important object of the present invention to incorporate cooling air ducting in the enclosure, and specifically within the base, in a manner much that the blower for the generator can be used to circulate all the cooling air needed to cool both the generator and the lubricating oil for the gas turbine engine. This object is accomplished by mounting the heat exchanger for the lubricating oil within the base and employing highly efficient ducting for circulating the cooling air from the generator to the heat exchanger.

A silencer for silencing the compressor noise is built into the inlet air ducting of the enclosure, and all of the required filtering of the inlet air is done within the enclosure. Thus, no auxiliary inlet air ducting is required to silence the compressor or to filter the incoming air.

The gas turbine engine of the present invention incorporates a specially configured inlet housing for the compressor which is effective to take the air from the inlet ducting of the enclosure and to introduce the air about the entire circumference of the compressor inlet with a highly uniform flow substantially free of turbulence or separation. The inlet housing achieves this function while retaining axial and radial compactness.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made a desired by those skilled in the art without departing from the present invention and the purview of the appended claims.

In the drawings:

FIG. 1 is a perspective view, broken away in parts to show details of construction, of an enclosure for a gas turbine engine and electric generator set constructed in accordance with one embodiment of the present invention;

FIG. 2 is an end elevation view, taken along the line and in the direction indicated by the arrows 2—2 in FIG. 1 (and partly broken away along the line and in the direction indicated by the arrows 2—2 in FIG. 6) of the enclosure shown in FIG. 1;

FIG. 3 is a fragmentary side elevation view taken along the line and in the direction indicated by the arrows 3—3 of FIG. 2;

FIG. 4 is a side elevation view of the enclosure shown in FIG. 1;

FIG. 5 is a fragmentary side elevation view of a modified exhaust gas ducting arrangement in which the cooling and ventilating air is introduced into the exhaust gases to aspirate the flow of the cooling and ventilating air;

FIG. 6 is a fragmentary plan view taken along the line and in the direction indicated by the arrows 6—6 in FIG. 3;

FIG. 7 is an end elevation view of the air inlet housing for the compressor end of the gas turbine engine of the enclosure shown in FIG. 1;

FIG. 8 is an elevation view taken along the line and in the direction indicated by the arrows 8—8 in FIG. 7;

FIG. 9 is a plan view taken along the line and in the direction indicated by the arrows 9—9 of FIG. 7;

FIG. 10 is an elevation view through a cross section of a flow divider and fuel nozzle for liquid fuel;

FIG. 11 is an end view of the fuel nozzle shown in FIG. 10;

FIG. 12 is an elevation view through a cross section of a fuel nozzle for gaseous fuel;

FIG. 13 is an enlarged end view of the fuel nozzle shown in FIG. 12;

Figure 14:
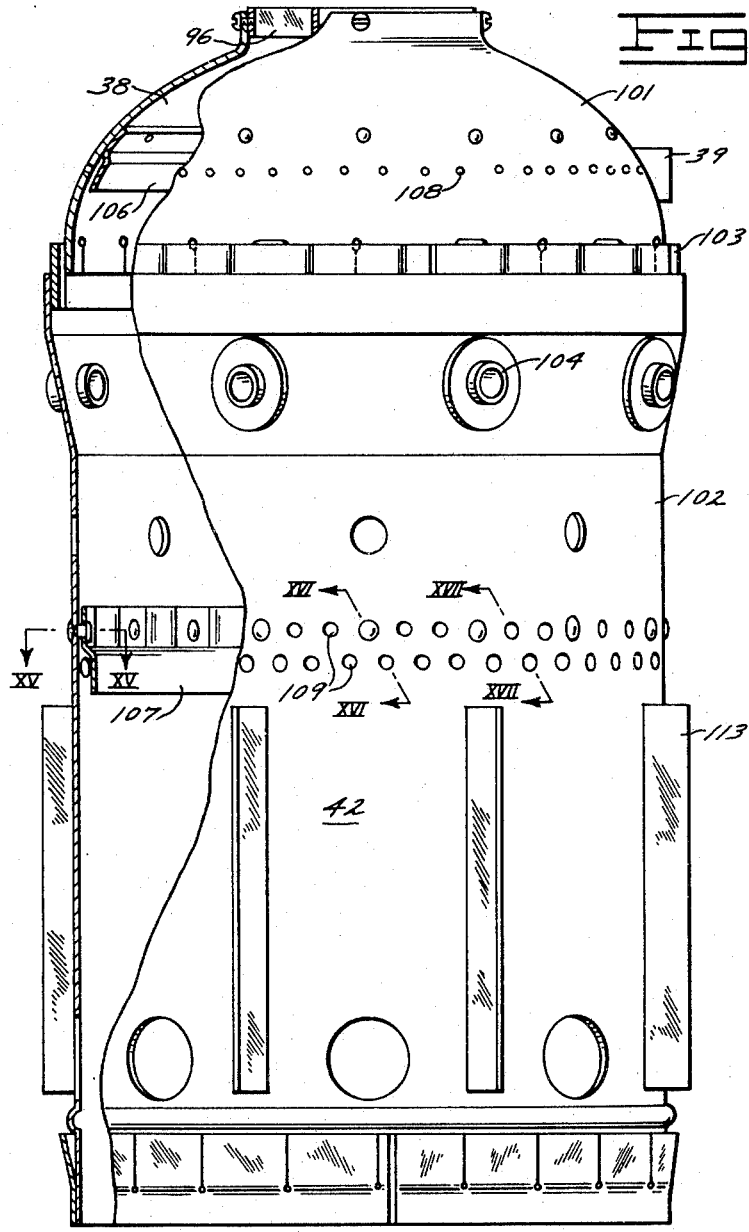
FIG. 14 is an elevation view, partly broken away to show details of construction, of a combustion chamber for the engine shown in FIG. 1.
Figure 16:
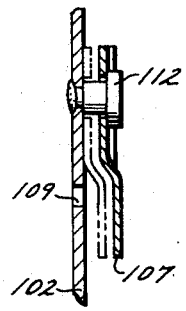
Figure 17:
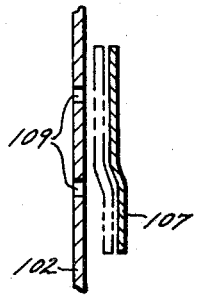

FIGS. 16 and 17 are fragmentary views taken along the lines and in the directions indicated by the arrows 16—16 and 17—17 in FIG. 14;

FIG. 18 is a fragmentary elevation view of a turbine inlet nozzle mounting arrangement used in the engine shown in FIG. 1;

FIG. 19 is a fragmentary elevation view showing an alternate insulation embodiment of the arrangement of FIG. 18;

FIG. 20 is a plan view of the lubricating oil circuit for the engine shown in FIG. 1; and FIG. 21 is an elevation view of the lubricating oil circuit shown in FIG. 20.

An enclosure for a gas turbine engine and electric generator set constructed in accordance with one embodiment of the present invention is indicated generally by the reference numeral 31 in FIGS. 1 and 4.

The entire enclosure 31 and all of its components are built upon a base 32. The gas turbine engine, indicated generally by reference numeral 33, and the electric generator 34 are mounted directly to the base 32.

The gas turbine engine 33 includes an inlet housing 36, described in greater detail below with reference to FIGS. 7, 8 and 9 and a centrifugal compressor 37 (see FIG. 1).

The air from the compressor is fed to a combustion chamber 38. The combustion chamber 38 includes an igniter 39, a fuel nozzle and flow divider 41, described in greater detail below with reference to FIGS. 10 through 13, and a liner 42, shown in detail in FIG. 14.

The outlet of the combustion chamber 38 is connected to a scroll 43. The scroll 43 directs the combustion gases to a turbine inlet nozzle assembly 44 and to a two-stage turbine wheel 46.

The exhaust gases leave the turbine through an exhaust duct 47 and exit from the enclosure 31 through an exhaust opening 48.

The turbine 46 drives the compressor 37 through a drive shaft 49 which is mounted for rotation in the main or bearing frame 51 of the engine 33.

The drive shaft 49 is also effective to drive the generator 34 through a long flexible quill shaft 52 and speed reduction gearing 53. Though not illustrated as such, the reduction gearing 53 may preferably include triaxial bevel drive gearing, and any one of four, or more, desired speed reductions may be obtained by changing the design parameters of one gear set in the reduction gearing 53.

The long flexible quill shaft permits some self adjustment of the shaft to compensate for misalignment of the gas turbine engine axis and the gear case input axis.

The output shaft of the reduction gearing 53 is connected to drive the generator 34. One form of the reduction gearing 53 reduces the output speed of the engine from 28,800 r.p.m. to an 1800 r.p.m. drive speed for the generator 34. As noted above, generator drive speeds of 2400, 3000 and 3600 r.p.m. can be obtained by minimum modification of the reduction gearing.

A blower 56 is also mounted for drive by the ouput shaft of the gearing 53, and this blower 56 forms an important element in a system for circulating cooling and ventilating air and which will now be described.

The enclosure 31 incorporates a cooling and ventilating arrangement which is effective to provide all of the cooling and to provide all of the ventilation required for safe operation without the need to resort to auxiliary external conduits or other structure. The cooling air is drawn in from the left-hand end of the generator 34 as viewed in FIGS. 1 and 4 through an opening which is not shown in the drawings. The cooling air flows over the generator and then is forced downwardly by the fan 56 to a cooling air duct 57 formed in the base 32. Turning vanes 58 turn the air upwardly, after it has passed along the underside of a sump 59 for the lubricating oil of the engine, and direct the air through an air-oil heat exchanger 61. The air-oil heat exchanger is in the engine lubricating oil circuit, which includes a pump 55 and filters 60 (see also FIGS. 20 and 21), and the air circulated through the heat exchanger 61 cools the oil before it is returned to the engine. The oil in the sump is additionally cooled by the flow of cooling air along the underside of the sump.

After the air passes through the heat exchanger 61 it is circulated past the outside of the gas turbine engine 33, as shown by the flow arrows where it serves to limit the temperature of the air in the enclosure to about 200° F. and also to remove any fumes that might leak from the gas turbine engine to the interior of the enclosure 31. The air is then exhausted from the enclosure 31 through louvers 50 as shown in FIG. 4. The separate hot engine exhaust may be directed to a boiler or other heat recovery system.

An alternate exhaust duct arrangement is shown in FIG. 5. In this arrangement the cooling air flow is introduced into the engine exhaust through a generally funnel-shaped member 62. In this arrangement the engine exhaust aspirates the cooling air flow and the combined exhaust is then turned through a ninety degree angle by the elbow 63. The cooling air flow reduces the temperature of the engine exhaust gases and eliminates the need for costly stainless steel exhaust ducting. The exhaust elbow 63 is preferably provided with sound insulation blankets on its walls. This insulation plus the right-angle bend reduces the exhaust noise to an acceptable level.

All controls for the gas turbine engine generator set are contained in the control console 66.

The enclosure 31, as noted above, contains all of the engine noise silencing and inlet air filtering required for installation and operation of the engine. The inlet silencing is provided by ducting which turns the incoming air through a series of right-angle turns, and against acoustical insulating material on some of the walls of the duct, to reduce the noise of the engine compressor to an unobjectionable level. Each right-angle bend reduces the noise transmission by approximately 7 to 10 decibels. In the enclosure 31 six right-angle bends are provided in combination with four air filters as will now be described.

With particular reference now to FIGS. 2, 3, and 6, the air for the gas turbine engine is brought into the enclosure 31 through a circular opening 67 in the top wall of the enclosure. The incoming air is immediately divided into two flow paths and turned through a first ninety degree bend by an inner ceiling 68. The air at this point flows in both a leftward direction and in a rightward direction as viewed in FIG. 2. For convenience of description only the continued flow of the leftwardly flowing air will be described. The structure which conducts the rightwardly flowing air to the engine is identical to that which will be described for the leftwardly flowing air.

After being turned ninety degrees by the inner ceiling 68 the air is again turned ninety degrees to a downward direction by the inner surface of an access panel 69. The air is subsequently turned through another ninety degrees and caused to pass through two air filters 71 as it is divided into two streams by a vertically extending wall 70 (see FIG. 3) after it passes through the filters.

The surfaces of the ceiling 68 and the access panels 69 are preferably coated with an acoustical material for silencing the compressor noise. Also, the panels 69 are disposed directly opposite the filters 71 so that the panels can be removed for access to the filters 71.

The air then passes through ports 72 (see FIG. 3) and into a longitudinally extending channel 73. In doing so the air is again turned through a right angle. At the outlet end of the channel 73 the air passes through ports 74, as it is turned through a ninety degree angle and into a chamber 76. The air is again turned through a ninety degree angle as it passes from the chamber 76 to the inlet of the compressor inlet housing 36.

The center-to-center distances between the ports 72 and 74 in each of the flow channels on either side of the dividing wall 70 are approximately equal to provide a balanced volume of air flow.

The compressor inlet housing 36 is specially shaped to produce a compact inlet housing which is easy to manufacture but which is highly efficient and effective to prevent turbulence and separation while providing uniform air flow at the compressor inlet. In order to turn the air flow so that a uniform flow occurs about the entire circumference of the compressor inlet, while retaining the feature of both axial and radial compactness, the walls of the inlet housing must be contoured to some shape other than a conventional rectangular or a U-shaped inlet. Such conventional inlets suffer the deficiencies of nonuniform flow, turbulence and fluid separation.

With reference now to FIGS. 7, 8 and 9, and particularly to FIG. 7, the inlet housing 36 is symmetric about a vertical plane passing through the center of reinforcing strut 81 at the inlet end of the housing and the axis of rotation AX of the compressor. The inlet contains a flared wall 80 which acts to accelerate and smooth the entry flow.

The inlet housing further comprises two distinct regions for handling the incoming air flow.

The first region is defined by the lower curved portions of the sidewalls 82 and functions to turn the incoming air through various angles up to an angle of 180° from a vertical direction to substantially symmetric flow in a radial direction with respect to the axis of rotation AX.

The second region is defined in part by the curved portions of the end walls 83 and 84 (see FIG. 8) and functions to turn the air from a radial direction through ninety degrees to an axial direction while accelerating the flow. The line of division between the first region and the second region is the base circle 86 as shown in FIG. 7.

In the particular inlet housing shown in FIGS. 7, 8 and 9 the curved portions of the sidewalls 82 are formed as involutes of the base circle 86. That is, each of these sidewalls corresponds to a curve traced by a point of a thread kept taut as it is wound upon or unwound from the base circle with one end of the thread fixed to the point indicated by the reference numeral 87 in FIG. 7 at the intersection of the base circle 86 and the vertical plane passing through the axis AX.

This contoured wall configuration would produce a direction of flow which would be perpendicular to the base circle at all points on the base circle if the fluid were incompressible. While the incoming air is compressible, the curvature of the sidewalls 82 is effective to produce substantially the same results as if the incoming fluid were incompressible, and this curvature is thus effective to cause all parts of the incoming air flow to move in the desired direction without turbulence, separation and nonuniform flow.

While the involute shape described has several advantages from the standpoint of ease of manufacture, other geometric forms could be utilized. It is necessary that the geometric form selected start at the approximate level of the top of the base circle 86, droop below the bottom of the base circle and terminate at approximately the bottom of the base circle in a symmetrical relationship with a vetrtically oriented axial plane.

The flow divider and fuel nozzle 41 for the gas turbine engine 33 is shown in more detail in FIGS. 10 through 13. FIGS. 10 and 11 show the construction used for liquid fuel, and FIGS. 12 and 13 show the construction used for gaseous fuel.

In the case of the liquid fuel nozzle the primary fuel flow is through line 89 and the secondary flow is through line 88. A solenoid controlled valve 90 is electrically actuated by a speed switch to control the position of the valve.

The fuel nozzle 41 for the gaseous fuel has a series of orifices 95 extending perpendicularly to the conical lower end of the nozzle to produce intimate mixing of the gas with the incoming swirl of air produced by the swirler vanes 96 at the top of the liner 42.

The combustion chamber 38 incorporates a liner 42 which, as best shown in FIG. 14, is of a two-part construction. The liner 42 has an upper dome-shaped section 101 and a lower cylindrical-shaped section 102. The dome is connected to the cylindrical section by a corrugated strip 103 which allows cooling air from the air jacket around the liner to flow through the liner and along the inner surfaces of the cylindrical section 102. Directing tubes 104 direct air radially inwardly a sufficient distance to aid combustion and to help eliminate hot spots which otherwise would be produced on the liner.

An upper cooling skirt 106 and a lower cooling skirt 107 direct air from the respective cooling holes 108 and 109 along the inner surfaces of the dome and the cylindrical section.

Figure 15:
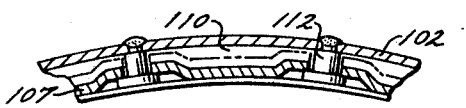
FIG. 15 is a fragmentary plan view taken along the line and in the direction indicated by the arrows 15—15 in FIG. 14.

High temperatures and skirt expansion are less of a problem in the dome section than in the cylindrical section. As a consequence the skirt 106 can be spot-welded directly to the dome 101. However, a rigid connection between the skirt 107 and the section 102 can cause distortion of the skirt 107. This distortion can restrict some of the cooling air passages 110 (see FIG. 15) between the skirt and the liner, and result in inadequate cooling air flow and the formation of hot spots on the liner itself.

This problem of distortion was eliminated by providing a floating connection between the skirt 107 and the liner section 102.

Radially inwardly projecting pins 112 are suitably attached at one end, as by a tungsten inert gas puddle melt welding process, to the liner section 102. The corrugated leading edge of the skirt 107 is supported on the inner ends of the pins 112. This construction permits the leading edge of the skirt 107, which generally runs somewhat hotter than the trailing edge, to expand and to contract without any physical restraint during temperature changes within the combustion chamber. As a result, the skirt does not distort and the skirt is at all times effective to direct the cooling air flow both upwardly and downwardly in the manner for which it is designed.

The liner 42 may also incorporate a plurality of circumferentially spaced fins 113 for preventing air swirl about the liner to thereby provide more uniform air entry for the cooling air admitted through the inlet holes.

The turbine inlet nozzle assembly is one component of the gas turbine engine which is subjected to large and rapid temperature changes during certain phases of operation of the gas turbine engine. The turbine nozzles must be retained in their operative position, but any excessive restraints on thermal growth can cause problems of distortion and cracking.

A turbine nozzle assembly construction and mounting arrangement which has been found effective to avoid problems of cracking is illustrated in FIG. 18.

The turbine nozzle assembly 44 includes a series of nozzles 116 mounted between an outer hoop 117 and an inner hoop 118. The outer hoop 117 is connected to a similar hoop 119 for the second stage turbine nozzle and both parts are suspended in part by a flexible curved wall 121 of a scroll 43 which conducts the hot gases from the combustion chamber 38 to the nozzle assembly 44. The opposite wall 122 of the scroll is preferably lined with insulation 123, and a passageway 124 may also be provided beneath the insulation for circulating cooling air between the scroll and the main frame 51 of the gas turbine engine.

The lower hoop 118 is supported from the frame 51 by a cone-shaped member 126. The cone-shaped member 126 is integral with the inner hoop at one end and is connected to the engine frame at the other end by a series of circumferentially spaced bolts 27. The cone-shaped member 126 provides a thin-walled, generally axially extending section which is flexible enough to permit thermal expansion of the nozzle assembly components and to prevent restraining stresses that could cause cracking during the thermal growth produced by rapid increases in temperature in the different parts of the nozzle assembly.

A ring of insulation 128 is disposed in a recess formed in the frame 51 beneath the cone-shaped member 126. This insulation ring is also mounted in position by the bolts 127. The insulation ring 128 and the cooling air passage 131 insulate the turbine bearing 129 mounted at the turbine end of the frame 51.

The bolts 127 may be drilled to provide passageways 131 for conducting cooling air through the bolts and against the base of the adjacent turbine wheel 46.

FIG. 19 illustrates a modified form of insulating the frame 51 from the hot products of combustion; wherein the insulation 123 is secured directly to the frame. Cooling air may be directed through passageway 132 and a series of ports 133 for cooling purposes.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. In a compressor having a rotational axis, the improvement comprising an air inlet housing having:
   a base circle concentric with and radially outward from the compressor axis,
   an inlet receiving air flow in said housing and extending to a plane which is tangent to said base circle,
   first region for handling air passing through said inlet comprising:
      curved wall structure extending from said tangent plane to said base circle in such a manner as to cause the air flow to cross said base circle on paths substantially perpendicular to said base circle so as to cause the air flow to converge substantially radially into said base circle, and
   a second region for handling air passing through said inlet comprising:
      curved wall structure extending from said base circle to an axially directed surface so as to direct the radially converging air flow into a direction of motion which is concentric to and parallel with the compressor axis.

2. The air inlet housing of claim 1 wherein said first region curved wall structure comprises:
   at least one involute of said base circle.

3. The air inlet housing of claim 1 wherein said first region curved wall structure comprises:
   a pair of involutes of said base circle.

4. The air inlet of claim 3 wherein said pair of involutes have a common point of origin on said base circle and said pair of involutes terminate at a common point on said base circle which is diametrically opposed to said point of origin.

References Cited

UNITED STATES PATENTS

| | | | |
|---|---|---|---|
| 2,344,456 | 3/1944 | Cassie | 230—132 |
| 2,801,518 | 8/1957 | Wosika et al. | 230—232 |
| 2,869,670 | 1/1959 | Hoffman | 230—232 |
| 2,942,683 | 6/1960 | Moyer | 230—232 |
| 3,077,731 | 2/1963 | Addie et al. | 230—232 |
| 3,221,500 | 12/1965 | Hill | 230—232 |
| 3,402,881 | 9/1968 | Moore et al. | 230—232 |

FOREIGN PATENTS 551,388   5/1932   Germany.

HENRY F. RADUAZO, Primary Examiner

U.S. Cl. X.R.

230—127, 132